Aug. 29, 1939.  J. BURNSIDE  2,171,393
WIND-SCREEN WIPER
Filed April 19, 1937
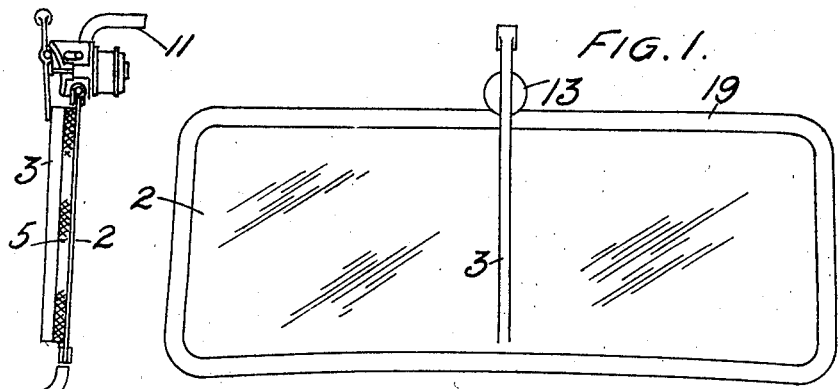
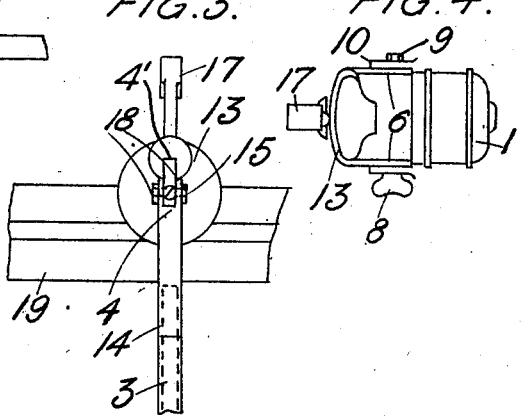
Inventor,
John Burnside
By Peck & Peck
Attys Patented Aug. 29, 1939

2,171,393

UNITED STATES PATENT OFFICE 2,171,393

WIND-SCREEN WIPER

John Burnside, Glasgow, Scotland

Application April 19, 1937, Serial No. 137,836
In Great Britain April 21, 1936

1 Claim. (Cl. 15—250)

This invention relates to windscreen wipers such as are commonly fitted to motor vehicles, rail-cars, aircraft, ships, motor boats and other conveyances having a transparent sheet which it is desired to keep free from rain and snow over an area through which an occupant views the road or the like.

Windscreen wipers as at present constructed generally have a wiper blade which is oscillated at a comparatively low speed by means of a suitable motor, e. g. an electric motor or a vacuum-operated motor, and a speed-reducing gear. These wipers are not entirely satisfactory as the eye unconsciously tends to follow the pendulum-like movements of the wiper blade and furthermore because these movements are executed too slowly to keep the windscreen clear in very wet weather.

Windscreen wipers have been proposed whose blades are rotated continuously about an axis located towards the middle of the depth of the screen so that the blades wipe over a full circular area thereof. It has been suggested that these wipers should be operated from wind-driven propellers and also by electric and other motors. They have the disadvantage that their central parts limit the driver's clear vision. This defect is aggravated in the wipers according to some proposals by the presence of transmission gear and supporting means extending to the axis of rotation from an edge of the windscreen.

It is the main object of the present invention to provide an improved windscreen wiper which does not suffer from the aforesaid disadvantages. Another object is to provide an improved windscreen wiper which shall effectively clear the moisture from the screen even in very wet weather.

In accordance with the invention, a windscreen wiper comprises a wiper blade or blades adapted for being continuously rotated in one direction about an axis at or near the edge of the windscreen, the arrangement being such that the blade or each blade wipes over the windscreen for approximately half a revolution and passes off from and on to the windscreen without fouling the edge or frame thereof.

An embodiment of a windscreen wiper for motor cars in accordance with the invention will now be described by way of example and with reference to the accompanying drawing, in which:

Fig. 1 is a front elevation of such embodiment,
Fig. 1a is a side elevation thereof, and
Figs. 2–4 show details to a larger scale.

Referring to the drawing, a suitable small motor 1 is mounted adjacent the windscreen 2, behind the center of the upper edge in the example illustrated, and has a wiper blade 3 mounted on the end of its spindle 4 so that the usual rubber wiping strip 5 on the blade contacts with the outer surface of the screen during its rotation. The blade 3 and strip 5 are preferably of such length that they extend almost to the bottom edge of the windscreen 2 and thus ensure that a very large area of the latter will be wiped during each revolution of the motor spindle.

The motor 1 is mounted upon a bracket 6 (Figs. 2 and 3) which is pivoted upon a pin 7 aligned with or constituted by the hinge-pin of the windscreen 2 and is adjustably secured in relation to the screen by a wind-nut 8 engaging a screw or stud 9 passed through both a pair of lugs 10 mounted on the car-body 11 or the screen 2 and a pair of arcuate slots 12 formed in the bracket 6 concentrically about the pin 7. By means of this adjustable connection the wiper blade 3 may be correctly positioned to exert the desired pressure upon the surface of the screen 2.

At its outer end the bracket 6 is formed with a face-cam 13 concentric with the motor spindle 4 and exhibiting a rise at its upper part. The mounting 14 for the wiper blade 3 is extended beyond its pivotal connection 15 to the said spindle to carry a ball 16 (Fig. 2) or other anti-friction device adapted to run in contact with the cam 13 and also to carry a counterweight 17. The connection between the spindle 4 and the blade 3 is such that these parts are constrained to rotate together about the axis of the spindle while being capable of movement relatively to each other about an axis disposed at right-angles to the said spindle, i. e. the axis of the pivot 15. Thus the mounting may be forked as shown at 18 (Fig. 3) or the end of the spindle may be slotted. The connection incorporates spring-means for example a leaf-spring 4' secured to the end of the spindle 4 (Figs. 2 and 3) for assisting in holding the ball 16 up against the cam 13.

In operation, the wiper blade 3 is rotated at the speed of the motor spindle 4 which is preferably so high that the blade cannot be perceived by the eye and consequently does not at any time obscure the field of vision. Due to the provision of the cam 13, the wiper blade is held in contact with the surface of the screen 2 over about 180° of each rotation but is lifted from this surface, as it approaches the framing 19 surrounding the screen, to travel through the air (broken line in Fig. 2) for the remainder of each rotation clear of the framing and of any projections on the body of the vehicle. The wiper blade is forced back into contact with the windscreen during each rotation just after it passes below the framing of the screen. The shape of the cam 13 determines the extent to which the wiper blade 3 projects above the roof of the vehicle.

What I claim is:

A windscreen wiper comprising a wiper blade, a mounting for the said blade near the edge of the screen, driving means for rotating the blade continuously in one direction about its axis of rotation in the said mounting so that it wipes over the screen for approximately one half of a revolution only and cam means arranged for maintaining the blade in contact with the screen during the said approximately one half revolution and for permitting deflection of the blade away from the plane of the screen during the remainder of the revolution.

JOHN BURNSIDE.